United States Patent
Bharti et al.

(10) Patent No.: US 12,462,193 B2
(45) Date of Patent: Nov. 4, 2025

(54) MULTI-OBJECTIVE WORK PRIORITIZATION FOR COMMON ASSETS

(71) Applicant: INTERNATIONAL BUSINESS MACHINES CORPORATION, Armonk, NY (US)

(72) Inventors: Harish Bharti, Pune (IN); Rajesh Kumar Saxena, Thane East (IN); Jayadev J, Kasaragod (IN); Sandeep Sukhija, Rajasthan (IN)

(73) Assignee: International Business Machines Corporation, Armonk, NY (US)

( * ) Notice: Subject to any disclaimer, the term of this patent is extended or adjusted under 35 U.S.C. 154(b) by 639 days.

(21) Appl. No.: 17/955,029

(22) Filed: Sep. 28, 2022

(65) Prior Publication Data

US 2024/0119343 A1    Apr. 11, 2024

(51) Int. Cl.
*G06N 20/00* (2019.01)
*G06F 18/214* (2023.01)
(Continued)

(52) U.S. Cl.
CPC .......... *G06N 20/00* (2019.01); *G06F 18/214* (2023.01); *G06Q 10/06311* (2013.01); *G06Q 10/0639* (2013.01)

(58) Field of Classification Search
CPC .................. G06N 20/00; G06F 18/214; G06Q 10/06311; G06Q 10/0639
See application file for complete search history.

(56) References Cited

U.S. PATENT DOCUMENTS

| 7,203,622 B2 | 4/2007 | Pan et al. |
| 2011/0161943 A1* | 6/2011 | Bellows ............... G06F 9/5066 |
| | | 717/149 |

(Continued)

FOREIGN PATENT DOCUMENTS

| CN | 105069516 B | 9/2018 |
| KR | 20140055100 A | 5/2014 |
| WO | 2018186537 A1 | 10/2018 |

OTHER PUBLICATIONS

William, E. et al., "Maintenance decision intelligence (MDI) strategy for protection assets while utilizing SmartGridDI TM," In2014 IEEE PES T&D Conference and Exposition, Apr. 14, 2014, pp. 1-5, IEEE.

(Continued)

*Primary Examiner* — David E Choi
(74) *Attorney, Agent, or Firm* — CHIP LAW GROUP

(57) ABSTRACT

Prioritizing a work request pertaining to a physical asset can include generating a data structure that encodes the work request as a multidimensional representation indicating at least one classification, each at least one classification including at least one sub-category. In response to identifying multiple work requests encoded as multidimensional representations with respect to the physical asset, each multidimensional representation can be reduced to a one-dimensional (1-D) representation that preserves a variance factor of each sub-category of each multidimensional representation. Each 1-D structure can be input to a machine learning model trained to prioritize each of the work requests. The work requests can be prioritized in accordance with the machine learning model based on the 1-D structures. The priorities of each of the work requests can be output.

20 Claims, 4 Drawing Sheets

(51) Int. Cl.
*G06Q 10/0631* (2023.01)
*G06Q 10/0639* (2023.01)

(56) References Cited

U.S. PATENT DOCUMENTS

| | | | |
|---|---|---|---|
| 2013/0297060 A1 | 11/2013 | Sundling, Jr. et al. | |
| 2014/0006909 A1* | 1/2014 | Florea | H03M 13/45 |
| | | | 714/776 |
| 2014/0279626 A1* | 9/2014 | Joo | G06Q 10/10 |
| | | | 705/319 |
| 2019/0073404 A1* | 3/2019 | Klouche | G06F 16/24578 |
| 2020/0410379 A1* | 12/2020 | Das | G06N 3/045 |
| 2022/0051163 A1* | 2/2022 | Kumon | G05B 19/406 |
| 2024/0119343 A1* | 4/2024 | Bharti | G06N 20/00 |

OTHER PUBLICATIONS

Žarković, MD et al., "Power Transformers Asset Management Based on Machine Learning," InThe 12th Mediterranean Conference on Power Generation, Transmission, Distribution and Energy Conversion (MEDPOWER 2020), Nov. 9, 2020, vol. 2020, pp. 127-134, IET.

Mell, P. et al., The NIST Definition of Cloud Computing, National Institute of Standards and Technology, U.S. Dept. of Commerce, Special Publication 800-145, Sep. 2011, 7 pg.

* cited by examiner

MULTI-OBJECTIVE WORK PRIORITIZATION FOR COMMON ASSETS

TECHNICAL FIELD

This disclosure relates to computer processing of data pertaining to operational assets, and more particularly, to using machine learning to prioritize work needed to maintain or enhance the operability of operational assets.

BACKGROUND

Most organizations depend to one degree or another on operational assets such as buildings, plants, machines, and various other types of equipment to carry out different tasks. Thus, not surprisingly, the effective and efficient scheduling of work orders for various types of work on such operational assets can be critical. Power utilities and other utility providers are examples of organizations that depend critically on such operative assets. Not only is it necessary to maintain the operative capabilities of operative assets already in place, but as an organization's tasks or missions evolve, new assets may need to be integrated with existing ones and old assets may need to be upgraded or replaced.

SUMMARY

In one or more embodiments, a method for prioritizing multiple work requests pertaining to a physical asset can include receiving a work request with respect to the physical asset and generating a data structure that encodes the work request as a multidimensional representation indicating at least one classification. Each at least one classification can include at least one sub-category. The method can include responding to identifying a plurality of work requests encoded as multidimensional representations with respect to the physical asset by reducing each multidimensional representation to a one-dimensional (1-D) representation. Each 1-D representation preserves a variance factor of each sub-category of each multidimensional representation. The method can include inputting each 1-D structure to a machine learning model trained to prioritize each of the plurality of work requests. The method can include prioritizing, in accordance with the machine learning model, each of the plurality of work requests based on the 1-D structures and outputting the priorities of each of the work requests.

In one or more embodiments, a system for prioritizing multiple work requests pertaining to a physical asset includes one or more processors configured to initiate operations. The operations can include receiving a work request with respect to the physical asset and generating a data structure that encodes the work request as a multidimensional representation indicating at least one classification. Each at least one classification can include at least one sub-category. The operations can include responding to identifying a plurality of work requests encoded as multidimensional representations with respect to the physical asset by reducing each multidimensional representation to a one-dimensional (1-D) representation. Each 1-D representation preserves a variance factor of each sub-category of each multidimensional representation. The operations can include inputting each 1-D structure to a machine learning model trained to prioritize each of the plurality of work requests. The operations can include prioritizing, in accordance with the machine learning model, each of the plurality of work requests based on the 1-D structures and outputting the priorities of each of the work requests.

In one or more embodiments, a computer program product includes one or more computer readable storage media having instructions stored thereon. The instructions are executable by a processor to initiate operations. The operations can include receiving a work request with respect to the physical asset and generating a data structure that encodes the work request as a multidimensional representation indicating at least one classification. Each at least one classification can include at least one sub-category. The operations can include responding to identifying a plurality of work requests encoded as multidimensional representations with respect to the physical asset by reducing each multidimensional representation to a one-dimensional (1-D) representation. Each 1-D representation preserves a variance factor of each sub-category of each multidimensional representation. The operations can include inputting each 1-D structure to a machine learning model trained to prioritize each of the plurality of work requests. The operations can include prioritizing, in accordance with the machine learning model, each of the plurality of work requests based on the 1-D structures and outputting the priorities of each of the work requests.

This Summary section is provided merely to introduce certain concepts and not to identify any key or essential features of the claimed subject matter. Other features of the inventive arrangements will be apparent from the accompanying drawings and from the following detailed description.

BRIEF DESCRIPTION OF THE DRAWINGS

The inventive arrangements are illustrated by way of example in the accompanying drawings. The drawings, however, should not be construed to be limiting of the inventive arrangements to only the particular implementations shown. Various aspects and advantages will become apparent upon review of the following detailed description and upon reference to the drawings.

DETAILED DESCRIPTION

Figure 1:
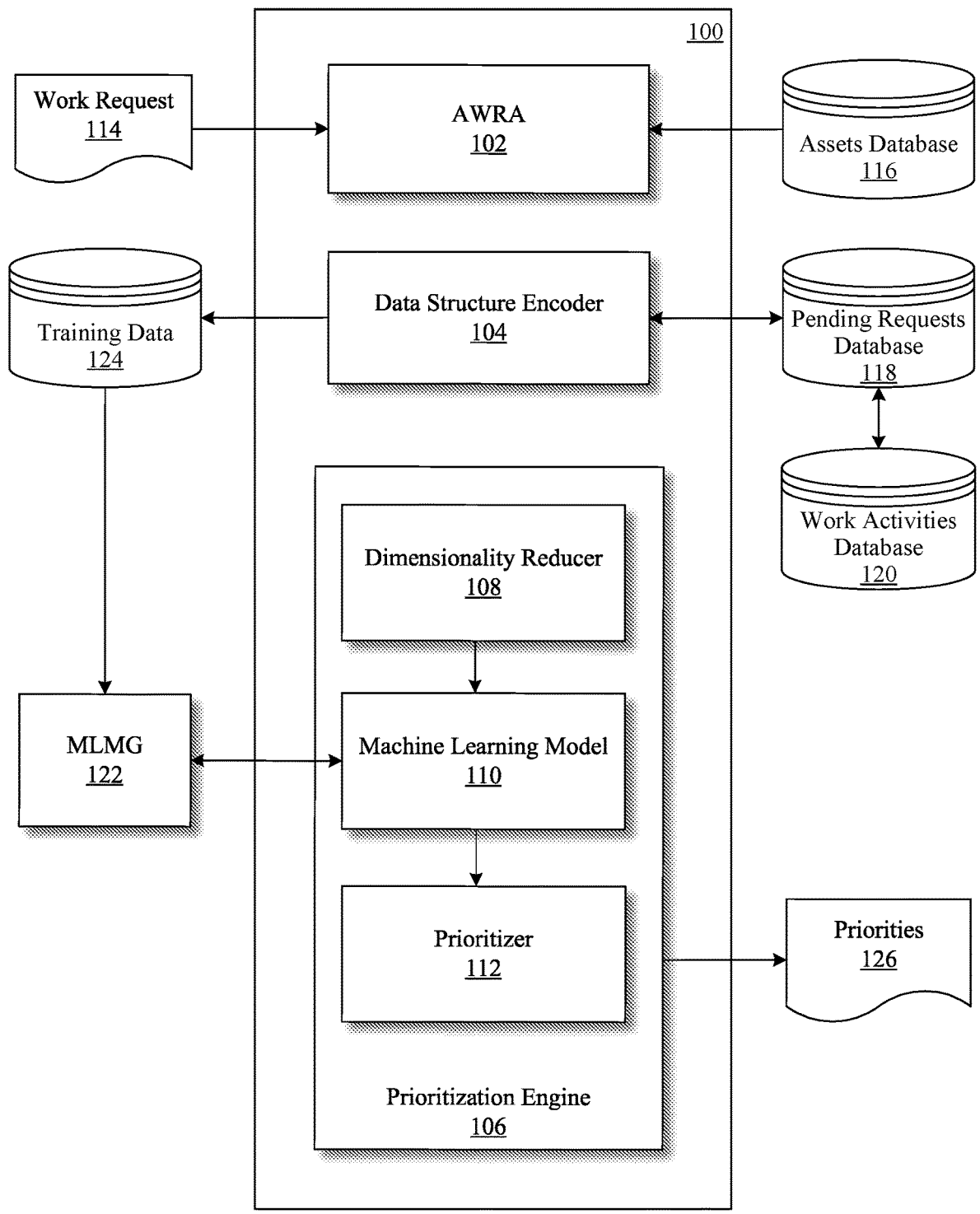
FIG. 1 illustrates an example system for prioritizing work requests for performing work on an operative asset.

While the disclosure concludes with claims defining novel features, it is believed that the various features described within this disclosure will be better understood from a consideration of the description in conjunction with the drawings. The process(es), machine(s), manufacture(s) and any variations thereof described herein are provided for purposes of illustration. Specific structural and functional details described within this disclosure are not to be interpreted as limiting, but merely as a basis for the claims and as a representative basis for teaching one skilled in the art to variously employ the features described in virtually any appropriately detailed structure. Further, the terms and phrases used within this disclosure are not intended to be limiting, but rather to provide an understandable description of the features described.

This disclosure relates to computer processing of data pertaining to operational assets, and more particularly, to using machine learning to prioritize work needed to maintain or enhance the operability of operational assets. Within an organization, a single operational asset may be utilized or maintained by multiple stakeholders, either individuals and/or groups of individuals within or associated with (e.g., contractors) the organization. It is possible, therefore, that at certain times there may arise multiple pending work requests pertaining to the operational asset. For example, in the context of a utility provider (e.g., power company) work activities with respect to an operational asset (e.g., transmission line, transformer, pole) may entail ensuring that the condition of the operational asset complies with various safety standards, that the operational asset is operating efficiently, is not in need of upgrades, and/or meets any of a host of other operating requirements. Thus, work (e.g., maintenance, repair, upgrades) pertaining to the operational asset may involve multiple work orders that fall into different work requirements or types (e.g., safety, repair, upgrade). Moreover, each of the requirements or types is likely to pose a different urgency given the type of work. For example, safety-related maintenance typically takes priority over an upgrade. Moreover, within a single category, different work orders may take precedence over others in the category. Within the safety category for maintaining a utility's power lines, for example, tightening a low-lying transmission line likely poses a greater urgency then renewing a ladder clamp.

Currently, the prioritization and scheduling of work orders is typically based on first come, first serve. Other approaches to the prioritization and scheduling may involve little more than subjective decision making. Subjective prioritization, however, is likely to lead to sub-optimal scheduling—especially if multiple work orders are interlinked such that one work activity affects one or more other work activities.

In accordance with the inventive arrangements disclosed herein, example methods systems, and computer program products are provided that are capable of prioritizing multiple work requests pertaining to the same asset. In accordance with certain inventive arrangements, the asset is identified. A multidimensional data structure representing multiple pending work requests (e.g., work orders) pertaining to the asset are generated. The respective priorities of the pending work requests are determined using a machine learning model that is trained to classify the work requests based on risk and other criticality factors.

An aspect of the inventive arrangements disclosed herein is a prioritization engine that is capable of reducing the dimensionality of data structures that encode work requests as multidimensional representations. The prioritization engine can reduce the work requests' dimensionality while preserving the information encoded in their corresponding data structures. The prioritization engine can decompose the multidimensional representations while retaining information such as type of work and sub-categories representing specific work activities of each type. A multidimensional representation can be reduced in dimensionality by the prioritization engine to a one-dimensional (1-D) norm. Each 1-D norm corresponding to a work request can be used by the machine learning model to determine (e.g., using a regression model) a priority associated with each work request pertaining to the operative asset. Optionally, a schedule for performing multiple work requests for various types of work on the asset in accordance with the respective priorities can be generated.

In accordance with certain inventive arrangements disclosed, the efficacy of the prioritization engine can be determined. The determination can be made based on a system-based comparison, in accordance with which, information retained by the reduced-dimension structures generated by the prioritization engine is compared with the pre-processing content encoded in the multidimensional data structure of the work request associated with an asset.

The specific asset may be a physical asset, which is one that an organization uses in carrying out certain activities. For example, the assets of a power utility may include multiple generators, substations, transformers, power lines, service vehicles, and a host of other physical assets for generating and distributing power to the organization's customers. For the specific asset, the inventive arrangements can identify one or more work requests associated with the asset. Each work request can be encoded as a data structure comprising multiple classifications and sub-categories. A classification can specify the type of work request, such as safety-related work or upgrade. Each classification can include different work activities as sub-categories. For example, with respect to maintenance, repair, upgrades, and other types of work on the power company's assets, a work request can request the re-tensioning of a low-lying transmission line or renewing a ladder clamp. As noted above, although both work activities can be classified as measures to ensure safety, the re-tensioning has greater urgency given the severity of the potential harm posed until the work is performed. The criticality of each specific sub-category of work activity for a given classification is encoded in the multidimensional data structure used to process work requests.

Each work request can be assigned a variance factor. As defined herein, "variance factor" establishes a precedence based on the type of work order requested and severity/urgency of the specific work requested. Thus, a variance factor uniquely corresponds to each category (type of work) and to each sub-category (specific work requested) within a category.

In response to determining that more than one work request is pending for an asset, the inventive arrangements can invoke certain operations of the prioritization engine to prioritize the work requests. The dimensionality reduction performed by the prioritization engine preserves information such as the urgency of the work request. Specifically, the dimensionality reduction can preserve the different variance factors associated with each of multiple work requests.

Thus, the machine learning model implemented by the prioritization engine, though using a reduced-dimension input, nonetheless can prioritize each work request based on pertinent information retained from the initial data structure representing the work request. Accordingly, the machine learning model is more likely to optimally prioritize multiple work requests pertaining to an asset. The machine learning model (e.g., a regression model) is trained through supervised learning using historical data. Though the data is reduced to a single dimension, the data nonetheless preserves critical information and is thus more likely to train the machine learning model to effectively and efficiently determine an optimal or near-optimal sequence for performing work activity in response to multiple work requests.

One of the additional advantages of the inventive arrangements disclosed herein is enhanced efficiency of the machine (e.g., computer) used for prioritizing multiple work requests. Multiple requests are encoded into a multidimensional data structure, which in turn, is reduced while preserving information needed for prioritizing the work requests. In certain arrangements, the multidimensional data structure is reduced to a 1-D norm. The dimensionality reduction obviates the need for processing higher-order tensors in performing a machine learning regression for prioritizing the work requests. Reduced dimensionality thus can reduce the burden on hardware assets, as well as reduce processing time associated with the prioritizing of multiple work requests. Thus, overall, an additional benefit of reducing the dimensionality of the data structures in accordance with the inventive arrangements is an improvement in operation of the computer hardware used to perform the processing.

Further aspects of the inventive arrangements described within this disclosure are described in greater detail with reference to the figures below. For purposes of simplicity and clarity of illustration, elements shown in the figures have not necessarily been drawn to scale. For example, the dimensions of some of the elements may be exaggerated relative to other elements for clarity. Further, where considered appropriate, reference numbers are repeated among the figures to indicate corresponding, analogous, or like features.

Figure 2:
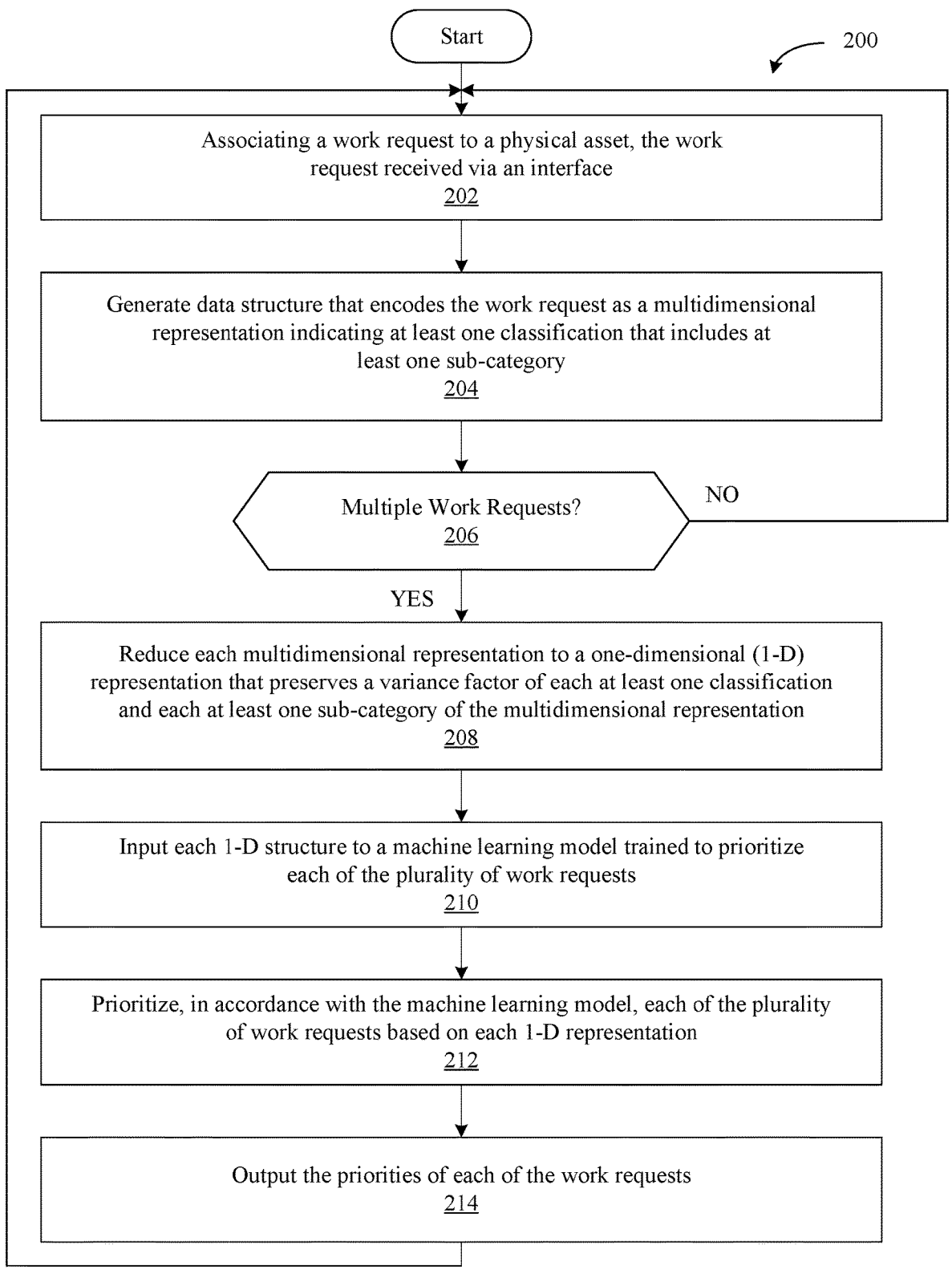
FIG. 2 illustrates certain methodological aspects of using the system of FIG. 1.

Referring initially to FIGS. 1 and 2, an example system for prioritizing work requests (system) 100, and a methodology 200 of implementing certain operative aspects of the disclosure are illustrated. System 100, in accordance with certain arrangements, illustratively includes asset work request associator (AWRA) 102, data structure encoder 104, and prioritization engine 106. Illustratively, prioritization engine 106 comprises dimensionality reducer 108, machine learning model 110, and prioritizer 112. AWRA 102, data structure encoder 104, as well as dimensionality reducer 108, machine learning model 110, and prioritizer 112 of prioritization engine 106, in various arrangements, can be implemented in hardware (e.g., dedicated hardwired circuitry), software (e.g., program code executed by one or more processors), or a combination thereof. For example, system 100 in certain embodiments may be implemented in computer-readable program instructions loaded onto a computer, such as computer 401 of computing environment 400 (FIG. 4).

Figure 4:
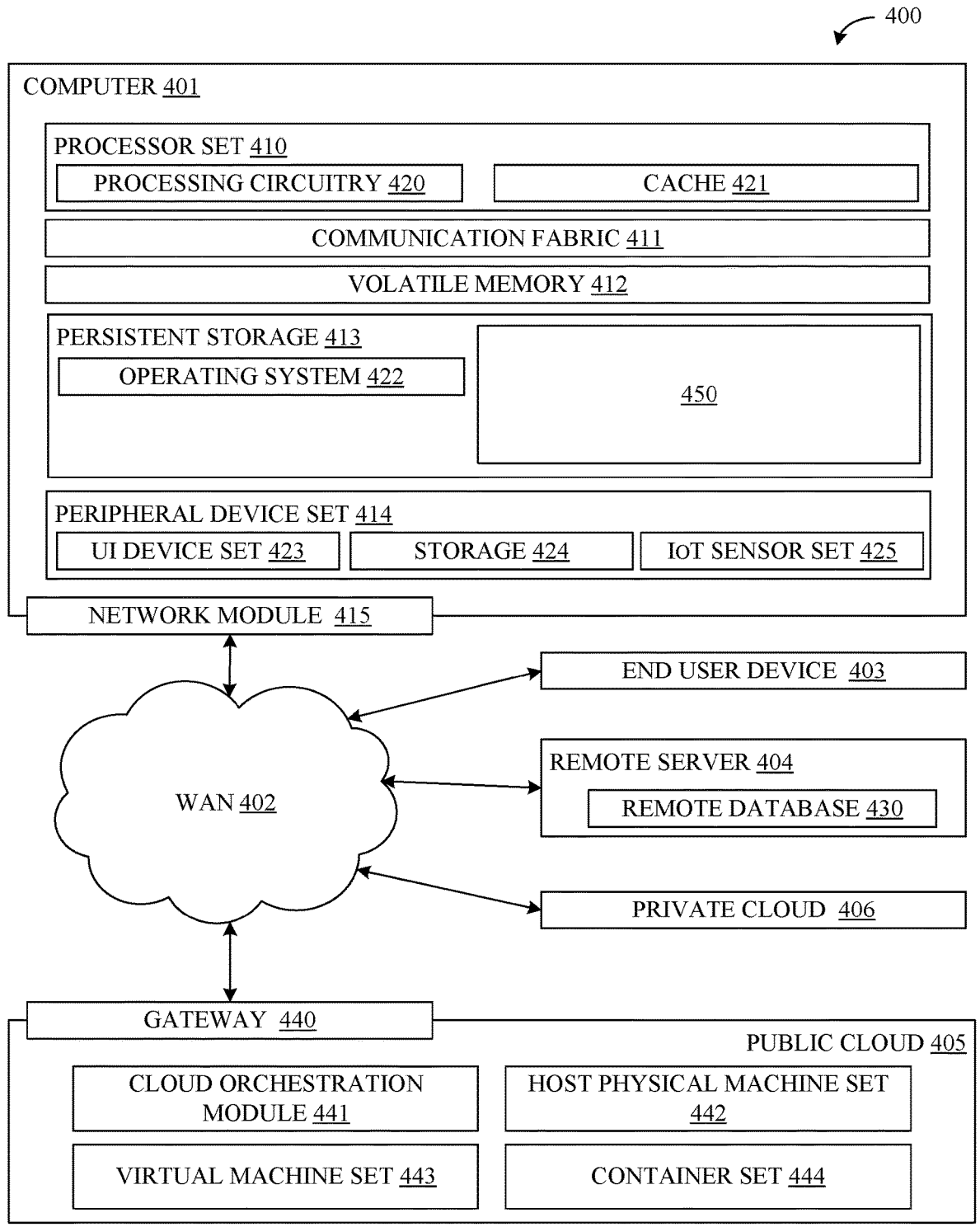
FIG. 4 illustrates an example computing environment for implementing aspects of the system of FIG. 1.

Operatively, at block 202, AWRA 102 is capable of receiving work request 114 via a computer interface, such as user interface (UI) device set 423 of computer 401 (FIG. 4). Thus, work request 114 can be received by ARMA 102 via a wired or wireless connection directly or through a communications network, such as the Internet or other data communications network. Work request 114 can be conveyed as text or voice, which can be converted to text by a voice-to-text converter (not shown). AWRA 102 can associate work request 114 with a specific physical asset. For example, in some arrangements, work request 114 can specify an indicator (e.g., serial number) indicating a specific asset among multiple assets whose identities are electronically stored in assets database 116. In certain arrangements, AWRA 102 can implement natural language processing (NLP) to identify the specific physical asset referenced by work request 114 if the request is conveyed via a voice-based input over a wireless or wired connection.

At block 204, data structure encoder 104 is capable of generating a data structure that encodes work request 114 as a multidimensional representation (e.g., matrix or higher-order tensor). The multidimensional representation can comprise one or more classifications or categories. Each classification or category can comprise one or more sub-categories corresponding to a specific work order. The different classifications and sub-categories corresponding to work orders can be electronically stored in work orders database 120. A classification can indicate a type of activity that is requested in a work order for the specific asset. The type, for example, can indicate that the activity is standard, is needed to correct an outage or offline state of the asset, is a regularly scheduled work activity, in an emergency activity, a failure-prevention activity, or the like. A sub-category can specify the specific work activity that is requested. Data structure encoder 104, for each specific work activity of a sub-category encodes a variance factor. The variance factor establishes a precedence based on the category (type of work) and a severity or urgency of each sub-category (work requested) within the category.

At block 206, AWRA 102 determines whether other work requests pertaining to the same physical asset associated with work request 114 are pending. AWRA 102 can make the determination by searching pending requests database 118 and seeking to match an asset identifier of work request 114 with an equivalent identifier of one or more pending work requests. If no match is found, system 100 can continue to receive other work requests. If at block 206 system 100 determines that multiple work requests are pending (work request 114 and at least one other) with respect to the same asset, then system 100 responds by invoking operations of prioritization engine 106.

Each of the multiple work requests that are pending can likewise be encoded as a multidimensional representation. If at block 206 prioritization engine 106 is invoked, then at block 208 the operations of dimensionality reducer 108 of prioritization engine 106 are initiated. Dimensionality reducer 108 is capable of reducing each multidimensional representation to a one-dimensional (1-D) representation that preserves the variance factor of each at least one classification and each at least one sub-category of the multidimensional representation of work request 114. The variance factor can indicate a criticality or urgency of the work specified by the sub-category.

At block 210, prioritization engine 106 inputs the 1-D representations to machine learning model 110. Machine learning model 110 can be generated by machine learning model generator (MLMG) 122. MLMG 122, as described below with reference to FIG. 3, can train machine learning model 110 through supervised learning using training data 124. Training data 124 can comprise prior prioritizations generated using machine learning model 110.

At block 212, machine learning model 110 prioritizes each of the multiple work requests by classifying the 1-D representations of each work request. Each 1-D representation is a reduction of the multidimensional representation generated from one of the multiple work requests and preserves the variance factor. The variance factor thus can indicate the urgency or criticality of a specific work activity. In certain arrangements, machine learning model 110 is trained to perform regressions that generate a priority of each of multiple work requests. Accordingly, priority of work request 114 by machine learning model 110, in some arrangements, can comprise a number on a continuous number line, where the position on the number line corresponds to a machine learning-determined priority. For example, numbers generated by machine learning model 110 in accordance with such arrangements can be scaled to lie on the continuum or at discrete intervals between zero and one such that the closer the number is to one, the greater the priority of the work request.

At block 214, prioritizer 112 of prioritization engine 106 outputs priorities 126 determined by machine learning model 110. In some arrangements, prioritizer 112 can generate a work schedule with respect to the asset based on priorities 126. Given that the reduced dimension representations preserve the predetermined variances, the work schedule can comprise a variance-preserving sequence of work orders. Optionally, the sequence can specify a time and/or date for performing each of the work orders. Machine learning model 110 also can be trained to generate priorities that indicate which, if any, work orders can be performed jointly as distinct from sequentially.

In some arrangements, data generated by data structure encoder 104 can be input to training data 124 and priorities determined by machine learning model 110 can be input to MLMG 122. Thus, by adding the data structure to training data 124 (an existing training set) an updated training set is generated. Using the updated training set and newly determined priorities for training, machine learning model 110 is trained using the updated training set.

In other arrangements, after each multidimensional representation is reduced to a 1-D representation, system 100 optionally can compare the variance factor of each sub-category with a pre-processing variance factor of each multidimensional representation. System 100 can thereby determine the efficacy of prioritization engine 106 based on the comparison.

Figure 3:
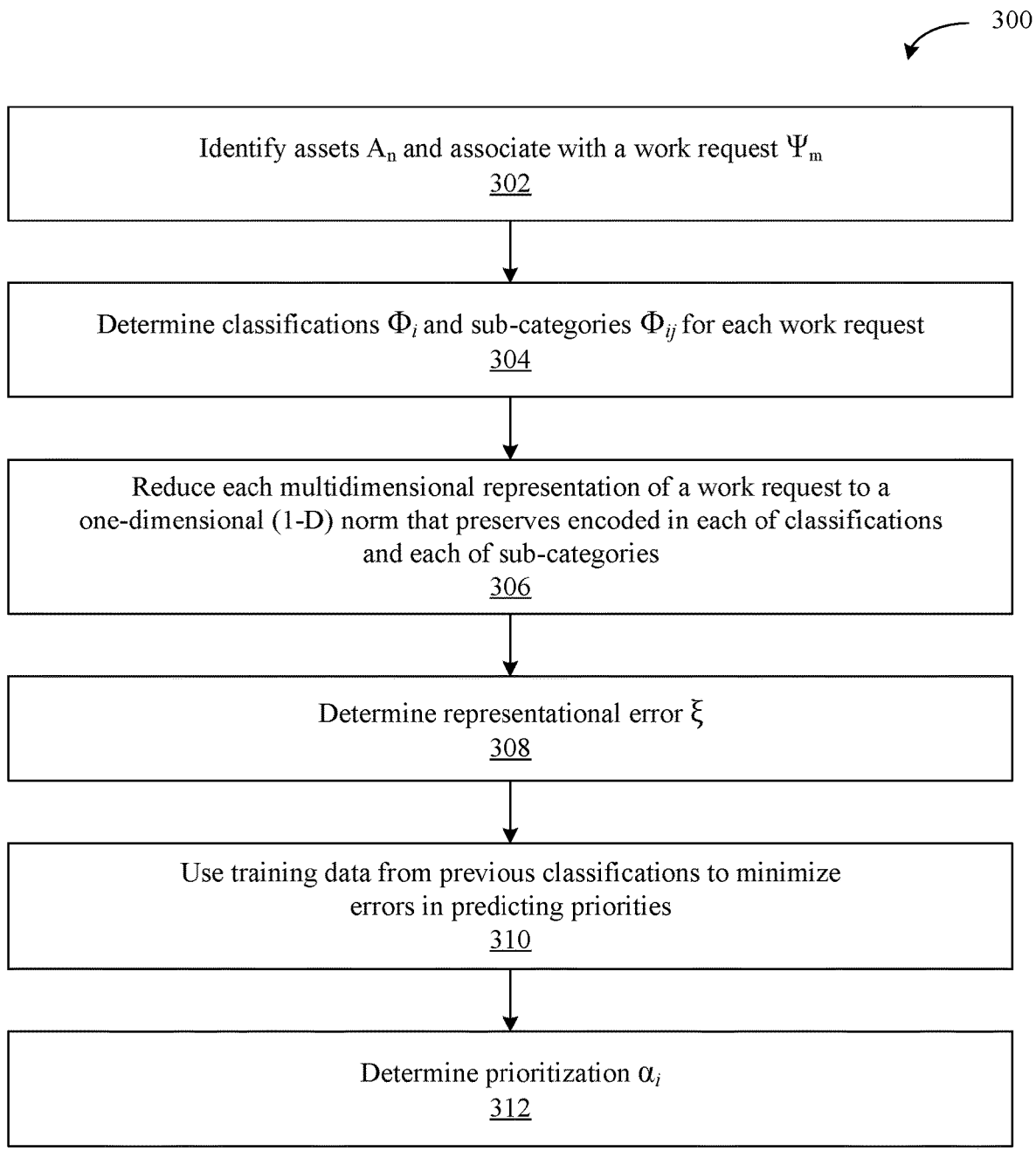
FIG. 3 illustrates an example method for building and training a machine learning model for the system of FIG. 1.

Referring additionally to FIG. 3, an example method 300 for constructing system 100 and training machine learning model 110 is illustrated. Illustratively, system 100 is constructed in accordance with method 300 for use by a specific organization that illustratively utilizes assets $A_n$, n=1, ..., N. A set of work requests (e.g., work orders) $\Psi_m$, m=1, ..., M, encompass various requests for performing different work orders for maintaining the organization's various assets $A_n$, n=1, ..., N. The work requests are categorized by $\Phi_i$, i=1, ..., I, classification criteria indicating the type of work requested. Each i-th classification $\Phi_i$ has J dimensions according to the number of sub-categories $\Phi_{ij}$, j=1, ..., J, each corresponding to a different work activity associated with the i-th classification $\Phi_i$.

Method 300 operates to reduce each multidimensional data structure that encodes a work request while preserving the classification information that is encoded in the i-th classification $\phi_i$ and i,j-th sub-category $\phi_{ij}$ corresponding to the work request. Thus, method 300 is capable of preserving work request information encoded in multidimensional spaces while reducing the work request to a 1-D structure. The 1-D structure can comprise a 1-D norm that, as described below, can be used for machine learning model 110 (e.g., regression model) to determine a prioritization $\alpha_i$ corresponding to the j-th sub-category of the i-th classification.

At block 302, AWRA 102 can identify assets $A_n$ and associate with each asset one or more work requests $\Psi_m$. At block 304, data structure encoder 104 can determine classifications $\Phi_i$ (work type) and sub-categories $\Phi_{ij}$ (specific work) for each work request. Assets $A_n$ are mapped from $\mathbb{R}^n$ to work requests $\Psi_m$ in $\mathbb{R}^m$. Accordingly, the following constraints are applicable:

$$\mathbb{R}^m, \triangleright (A_n, \Psi_m, \Phi_i, \Phi_{ij}, \alpha_i)_{i,j,m,n \geq 0} \in \mathbb{R}^{m,n} \vee \mathbb{R}^n \rightarrow \mathbb{R}^m, \quad \text{Eq. (1)}$$

where the set $\{A_n, \Psi_m, \Phi_i, \Phi_{ij}, \alpha_i\}_{i,j,m,n \geq 0}$ is a normal subgroup of $\mathbb{R}^{m,n}$.

Because $\{A_n, \Psi_m, \Phi_i, \Phi_{ij}, \alpha_i\}_{i,j,m,n \geq 0}$ is a normal subgroup of any element of $\{A_n, \Psi_m, \Phi_i, \Phi_{ij}, \alpha_i\}_{i,j,m,n \geq 0}$ by an element of $\mathbb{R}^{m,n}$ is also in $\{A_n, \Psi_m, \Phi_i, \Phi_{ij}, \alpha_i\}_{i,j,m,n \geq 0}$. This property of the $\{A_n, \Psi_m, \Phi_i, \Phi_{ij}, \alpha_i\}_{i,j,m,n \geq 0}$ is helpful in performing subsequent processing according to an aspect of the inventive arrangements, as described below.

A prioritization $\alpha_i$ can be related to the i-th classification $\phi_i$ as a resolution of a set of basis vectors according to the following:

$$\alpha_i = \Sigma_{i=1}^n \psi_i \phi_i \sim \psi_i \langle \alpha_i, \phi_i \rangle, \quad \text{Eq. (2)}$$

where, $\{\phi_1 \ldots \phi_n\}$ forms an orthogonal basis of n-dimensional space with the coordinates of $\psi$:

$$\psi_i = \alpha_i^T \phi_i \forall i=1, \ldots n. \quad \text{Eq. (3)}$$

At block 306, dimensionality reducer 108 of prioritization engine 106 can reduce each multidimensional representation of a work request to a one-dimensional (1-D) norm that preserves information encoded in each classification and each of the sub-categories. Thus, dimensionality reducer 108 can generate a representation of the classifiers with in basis vectors, m<n, and can replace the coordinates by pre-selected coordinates (scalars). The dimensionality of the representation is reduced, accordingly. Prioritization engine 106 is configured to project the prioritization $\alpha_i$ onto the reduced basis:

$$\breve{\alpha} = \Sigma_{i=1}^m \psi_i \phi_i + \Sigma_{i=m+1}^n \beta_i \phi_i, \quad \text{Eq. (4)}$$

where $\breve{\alpha}$ is the projected prioritization in the final state. As a 1-D representation (e.g., norm), $\breve{\alpha}$ can comprise a prioritization line. MLMG 122 can train machine learning model 110 by minimizing a representation error of the model based on comparing a model determined prioritization with a correct prioritization.

Note that with respect to $\alpha_i$ of Eq. (2) there is a loss of information associated with $\breve{\alpha}$. This is shown be comparing the first term of equation Eq. (4) with $\alpha_i$ of Eq. (2). The first term of Eq. (4) is not congruous with Eq. (2) in so far as the first term of Eq. (4) sums from 1 to m, which is less than n as in the summation of Eq. (2). The second term of Eq. (4) corresponds to the loss and can be used as a representational error. The representational error is minimized in order to capture sufficient information with the first term of Eq. (4), which corresponds to a reduced dimensionality m<n.

At block 308, representational error $\xi$ can be determined by MLMG 122 as $$\xi = \Sigma_{i=m+1}^n [\psi_i - \beta_i] \phi_i. \quad \text{Eq. (5)}$$

Based on the results of Eq. (4) and Eq. (5), MLMG 122 can generate the representational error as a singular norm:

$$\Sigma[|\epsilon_\alpha|^2] = E[\Sigma_{i=m+1}^n \Sigma_{j=m+1}^n [\psi_i - \beta_i][\psi_j - \beta_j] \phi_i^T \phi_i]. \quad \text{Eq. (6)}$$

Configuring the representational error in terms of the expected value according to Eq. (6) enables the minimization using the method of Lagrange. Using the method of Lagrange, classifiers can be optimized to a covariance matrix such that the classifiers can be determined from projection of the singular norm $|\xi_\alpha|^2$.

By the method of Lagrange, MLMG 122 minimizes the representational error subject to the above-described constraints according to $$\min_{\phi_i} J\{\phi_i\} \left\{ \Sigma_{j=m+1}^n \phi_{ij}^T \Delta_\alpha \phi_{ij} + \Sigma_{j=m+1}^n \nabla_\alpha \left(1 - \phi_{ij}^T \phi_{ij}\right) \right\}, \quad \text{Eq. (7)}$$

where $J\{\phi_i\}$ is the Lagrange multiplier, $\Delta_\alpha$ is a covariance matrix trace, and $\nabla_\alpha$ is the covariance matrix trace conjugates. Using the Lagrange multiplier $J\{\phi_i\}$, based on covariance matrix trace $\Delta_\alpha$ and covariance matrix trace conjugates $\nabla_\alpha$, MLMG 122 can optimize predictions of machine learning model 110. Using the covariance matrix, MLMG 122 can project representational errors to the singular norm $|\xi_\alpha|^2$, which is the definition of an error on a prioritization line.

At block 310, MLMG 122 can use training data from previous classifications (priority determinations) by machine learning model 110 to minimize errors in predicting work request priorities. MLMG 122 can use training data 124 comprising all the previous classifications of work requests to reduce the dimensions of the data and minimize representational errors in accordance with Eq. (7). MLMG 122 performs the operations by capturing covariance trace and the negatives, which MLMG 122 captures as algebraic conjugates of the covariance trace.

MLMG 122 can use the covariance matrix trace $\Delta_\alpha$ to define the representational error, which is resolved to preserve maximum variance as follows:

$$E[|\xi_\alpha|^2] = \Sigma_{j=m+1}^{n} \phi_i^T \Delta_\alpha \phi_i. \quad \text{Eq. (8)}$$

Machine learning model 110, as trained, projects the data representations on orthogonal pairs of zero and one.

At block 312, machine learning model 110 determines prioritization cu. As trained, machine learning model 110 minimizes the representation error by confining computation to determining a smallest eigenvalue. The determination is made in accordance with Eq. (7) and Eq. (8), such that representation errors correspond to the in eigenvalues of covariance matrix trace $\Delta_\alpha$ in the principal direction (gradient descent) of a predetermined error function.

An aspect of method 300 is that classifiers can be optimized with the covariance matrix and projected to the singular norm $|\xi_\alpha|^2$, as described above. All previous work requests can be used to train machine learning model 110. As the number of decisions made with machine learning model 110 increases with each of the work requests that is processed according blocks 302 to 312, the decisions can be used to train machine learning 110. Iteratively, machine learning model should improve its predictive accuracy as Eq. (8) gets smaller with successive training.

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

Computing environment 400 contains an example of an environment for the execution of at least some of the computer code involved in performing the inventive methods, such as prioritizing multiple work requests for a single asset, illustrated at block 450. The inventive methods performed with the computer code of block 450 can include implementing procedures for reducing data structures for multidimensional structures to a 1-D representation, inputting the 1-D representation into a machine learning model trained to prioritize work requests, and outputting a prioritized schedule of work, as described herein in the context of system 100 and methodology 200. In addition to block 450, computing environment 400 includes, for example, computer 401, wide area network (WAN) 402, end user device (EUD) 403, remote server 404, public cloud 405, and private cloud 406. In this embodiment, computer 401 includes processor set 410 (including processing circuitry 420 and cache 421), communication fabric 411, volatile memory 412, persistent storage 413 (including operating system 422 and block 450, as identified above), peripheral device set 414 (including user interface (UI) device set 423, storage 424, and Internet of Things (IoT) sensor set 425), and network module 415. Remote server 404 includes remote database 430. Public cloud 405 includes gateway 440, cloud orchestration module 441, host physical machine set 442, virtual machine set 443, and container set 444.

COMPUTER 401 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 430. As is well understood in the art of computer technology, and depending upon the technology, performance of a computer-implemented method may be distributed among multiple computers and/or between multiple locations. On the other hand, in this presentation of computing environment 400, detailed discussion is focused on a single computer, specifically computer 401, to keep the presentation as simple as possible. Computer 401 may be located in a cloud, even though it is not shown in a cloud in FIG. 4. On the other hand, computer 401 is not required to be in a cloud except to any extent as may be affirmatively indicated.

PROCESSOR SET 410 includes one, or more, computer processors of any type now known or to be developed in the future. Processing circuitry 420 may be distributed over multiple packages, for example, multiple, coordinated integrated circuit chips. Processing circuitry 420 may implement multiple processor threads and/or multiple processor cores. Cache 421 is memory that is located in the processor chip package(s) and is typically used for data or code that should be available for rapid access by the threads or cores running on processor set 410. Cache memories are typically organized into multiple levels depending upon relative proximity to the processing circuitry. Alternatively, some, or all, of the cache for the processor set may be located "off chip." In some computing environments, processor set 410 may be designed for working with qubits and performing quantum computing.

Computer readable program instructions are typically loaded onto computer 401 to cause a series of operational steps to be performed by processor set 410 of computer 401 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 421 and the other storage media discussed below. The program instructions, and associated data, are accessed by processor set 410 to control and direct performance of the inventive methods. In computing environment 400, at least some of the instructions for performing the inventive methods may be stored in block 450 in persistent storage 413.

COMMUNICATION FABRIC 411 is the signal conduction paths that allow the various components of computer 401 to communicate with each other. Typically, this fabric is made of switches and electrically conductive paths, such as the switches and electrically conductive paths that make up busses, bridges, physical input/output ports and the like. Other types of signal communication paths may be used, such as fiber optic communication paths and/or wireless communication paths.

VOLATILE MEMORY 412 is any type of volatile memory now known or to be developed in the future. Examples include dynamic type random access memory (RAM) or static type RAM. Typically, the volatile memory is characterized by random access, but this is not required unless affirmatively indicated. In computer 401, the volatile memory 412 is located in a single package and is internal to computer 401, but, alternatively or additionally, the volatile memory may be distributed over multiple packages and/or located externally with respect to computer 401.

PERSISTENT STORAGE 413 is any form of non-volatile storage for computers that is now known or to be developed in the future. The non-volatility of this storage means that the stored data is maintained regardless of whether power is being supplied to computer 401 and/or directly to persistent storage 413. Persistent storage 413 may be a read only memory (ROM), but typically at least a portion of the persistent storage allows writing of data, deletion of data and re-writing of data. Some familiar forms of persistent storage include magnetic disks and solid-state storage devices. Operating system 422 may take several forms, such as various known proprietary operating systems or open-source Portable Operating System Interface type operating systems that employ a kernel. The code included in block 450 typically includes at least some of the computer code involved in performing the inventive methods.

PERIPHERAL DEVICE SET 414 includes the set of peripheral devices of computer 401. Data communication connections between the peripheral devices and the other components of computer 401 may be implemented in various ways, such as Bluetooth connections, Near-Field Communication (NFC) connections, connections made by cables (such as universal serial bus (USB) type cables), insertion type connections (e.g., secure digital (SD) card), connections made though local area communication networks and even connections made through wide area networks such as the internet. In various embodiments, UI device set 423 may include components such as a display screen, speaker, microphone, wearable devices (such as goggles and smart watches), keyboard, mouse, printer, touchpad, game controllers, and haptic devices. Storage 424 is external storage, such as an external hard drive, or insertable storage, such as an SD card. Storage 424 may be persistent and/or volatile. In some embodiments, storage 424 may take the form of a quantum computing storage device for storing data in the form of qubits. In embodiments where computer 401 is required to have a large amount of storage (e.g., where computer 401 locally stores and manages a large database) then this storage may be provided by peripheral storage devices designed for storing very large amounts of data, such as a storage area network (SAN) that is shared by multiple, geographically distributed computers. IoT sensor set 425 is made up of sensors that can be used in Internet of Things applications. For example, one sensor may be a thermometer and another sensor may be a motion detector.

NETWORK MODULE 415 is the collection of computer software, hardware, and firmware that allows computer 401 to communicate with other computers through WAN 402. Network module 415 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 415 are performed on the same physical hardware device. In other embodiments (e.g., embodiments that utilize software-defined networking (SDN)), the control functions and the forwarding functions of network module 415 are performed on physically separate devices, such that the control functions manage several different network hardware devices. Computer readable program instructions for performing the inventive methods can typically be downloaded to computer 401 from an external computer or external storage device through a network adapter card or network interface included in network module 415.

WAN 402 is any wide area network (e.g., the internet) capable of communicating computer data over non-local distances by any technology for communicating computer data, now known or to be developed in the future. In some embodiments, the WAN may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

END USER DEVICE (EUD) 403 is any computer system that is used and controlled by an end user (e.g., a customer of an enterprise that operates computer 401), and may take any of the forms discussed above in connection with computer 401. EUD 403 typically receives helpful and useful data from the operations of computer 401. For example, in a hypothetical case where computer 401 is designed to provide a recommendation to an end user, this recommendation would typically be communicated from network module 415 of computer 401 through WAN 402 to EUD 403. In this way, EUD 403 can display, or otherwise present, the recommendation to an end user. In some embodiments, EUD 403 may be a client device, such as thin client, heavy client, mainframe computer, desktop computer and so on.

REMOTE SERVER 404 is any computer system that serves at least some data and/or functionality to computer 401. Remote server 404 may be controlled and used by the same entity that operates computer 401. Remote server 404 represents the machine(s) that collect and store helpful and useful data for use by other computers, such as computer 401. For example, in a hypothetical case where computer 401 is designed and programmed to provide a recommendation based on historical data, then this historical data may be provided to computer 401 from remote database 430 of remote server 404.

PUBLIC CLOUD 405 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economies of scale. The direct and active management of the computing resources of public cloud 405 is performed by the computer hardware and/or software of cloud orchestration module 441. The computing resources provided by public cloud 405 are typically implemented by virtual computing environments that run on various computers making up the computers of host physical machine set 442, which is the universe of physical computers in and/or available to public cloud 405. The virtual computing environments (VCEs) typically take the form of virtual machines from virtual machine set 443 and/or containers from container set 444. It is understood that these VCEs may be stored as images and may be transferred among and between the various physical machine hosts, either as images or after instantiation of the VCE. Cloud orchestration module 441 manages the transfer and storage of images, deploys new instantiations of VCEs and manages active instantiations of VCE deployments. Gateway 440 is the collection of computer software, hardware, and firmware that allows public cloud 405 to communicate through WAN 402.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

PRIVATE CLOUD 406 is similar to public cloud 405, except that the computing resources are only available for use by a single enterprise. While private cloud 406 is depicted as being in communication with WAN 402, in other embodiments a private cloud may be disconnected from the internet entirely and only accessible through a local/private network. A hybrid cloud is a composition of multiple clouds of different types (e.g., private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 405 and private cloud 406 are both part of a larger hybrid cloud.

The terminology used herein is for the purpose of describing particular embodiments only and is not intended to be limiting. Notwithstanding, several definitions that apply throughout this document now will be presented.

As defined herein, the singular forms "a," "an," and "the" include the plural forms as well, unless the context clearly indicates otherwise.

As defined herein, "another" means at least a second or more.

As defined herein, "at least one," "one or more," and "and/or," are open-ended expressions that are both conjunctive and disjunctive in operation unless explicitly stated otherwise. For example, each of the expressions "at least one of A, B and C," "at least one of A, B, or C," "one or more of A, B, and C," "one or more of A, B, or C," and "A, B, and/or C" means A alone, B alone, C alone, A and B together, A and C together, B and C together, or A, B and C together.

As defined herein, "automatically" means without user intervention.

As defined herein, "includes," "including," "comprises," and/or "comprising," specify the presence of stated features, integers, steps, operations, elements, and/or components, but do not preclude the presence or addition of one or more other features, integers, steps, operations, elements, components, and/or groups thereof.

As defined herein, "if" means "in response to" or "responsive to," depending upon the context. Thus, the phrase "if it is determined" may be construed to mean "in response to determining" or "responsive to determining" depending on the context. Likewise, the phrase "if [a stated condition or event] is detected" may be construed to mean "upon detecting [the stated condition or event]" or "in response to detecting [the stated condition or event]" or "responsive to detecting [the stated condition or event]" depending on the context.

As defined herein, "one embodiment," "an embodiment," "in one or more embodiments," "in particular embodiments," or similar language mean that a particular feature, structure, or characteristic described in connection with the embodiment is included in at least one embodiment described within this disclosure. Thus, appearances of the aforementioned phrases and/or similar language throughout this disclosure may, but do not necessarily, all refer to the same embodiment.

As defined herein, the phrases "in response to" and "responsive to" mean responding or reacting readily to an action or event. Thus, if a second action is performed "in response to" or "responsive to" a first action, there is a causal relationship between an occurrence of the first action and an occurrence of the second action. The phrases "in response to" and "responsive to" indicate the causal relationship.

As defined herein, "end user" means a human being.

The terms first, second, etc. may be used herein to describe various elements. These elements should not be limited by these terms, as these terms are only used to distinguish one element from another unless stated otherwise or the context clearly indicates otherwise.

The inventive arrangements disclosed herein have been presented for purposes of illustration and are not intended to be exhaustive or limited to the specific ones disclosed. Many modifications and variations will be apparent to those of ordinary skill in the art without departing from the scope and spirit of the described inventive arrangements. The terminology used herein was chosen to best explain the principles of the inventive arrangements, the practical application or technical improvement over technologies found in the marketplace, or to enable others of ordinary skill in the art to understand the inventive arrangements disclosed herein.

What is claimed is:

1. A computer-implemented method, comprising:
receiving, via a computer interface of a computer, a work request with respect to a physical asset;
generating, by the computer, a data structure that encodes the work request as a multidimensional representation indicating at least one classification, wherein each at least one classification includes at least one sub-category; and
responsive to identifying, by the computer, a plurality of work requests encoded as multidimensional representations with respect to the physical asset, invoking operations of a prioritization engine implemented by the computer, wherein the operations of the prioritization engine include:
reducing each multidimensional representation to a one-dimensional (1-D) representation that preserves a variance factor of each sub-category of each multidimensional representation;
inputting each 1-D structure to a machine learning model trained to prioritize each of the plurality of work requests;
prioritizing, in accordance with the machine learning model, each of the plurality of work requests based on the 1-D structures; and
outputting the priorities of each of the work requests.

2. The computer-implemented method of claim 1, further comprising:
generating an updated training set by adding the data structure to an existing training set; and
training the machine learning model using the updated training set.

3. The computer-implemented method of claim 1, wherein each variance factor of a sub-category indicates at least one of a criticality or urgency of the sub-category.

4. The computer-implemented method of claim 1, further comprising:
comparing the variance factor of each sub-category following the reducing each multidimensional representation to a 1-D representation with a pre-processing variance factor of each multidimensional representation; and
based on the comparing, determining an efficacy of the prioritization engine.

5. The computer-implemented method of claim 1, wherein for each multidimensional representation, the at least one category and at least one sub-category correspond, respectively, to a type of work and a work activity.

6. The computer-implemented method of claim 1, further comprising:
determining a schedule of work performances based on the priorities; and
outputting the schedule of work performances.

7. The computer-implemented method of claim 6, wherein the schedule of work performances comprises a variance-preserving sequence of work activities.

8. A system, comprising:
a processor configured to initiate operations including:
receiving a work request with respect to a physical asset;
generating a data structure that encodes the work request as a multidimensional representation indicating at least one classification, wherein each at least one classification includes at least one sub-category; and
responsive to identifying a plurality of work requests encoded as multidimensional representations with respect to the physical asset:
reducing each multidimensional representation to a one-dimensional (1-D) representation that preserves a variance factor of each sub-category of each multidimensional representation;
inputting each 1-D structure to a machine learning model trained to prioritize each of the plurality of work requests;
prioritizing, in accordance with the machine learning model, each of the plurality of work requests based on the 1-D structures; and
outputting the priorities of each of the work requests.

9. The system of claim 8, wherein the processor is configured to initiate operations further including:
generating an updated training set by adding the data structure to an existing training set; and
training the machine learning model using the updated training set.

10. The system of claim 8, wherein each variance factor of a sub-category indicates at least one of a criticality or urgency of the sub-category.

11. The system of claim 8, wherein the processor is configured to initiate operations further including:
comparing the variance factor of each sub-category following the reducing each multidimensional representation to a 1-D representation with a pre-processing variance factor of each multidimensional representation; and
based on the comparing, determining an efficacy of the prioritization engine.

12. The system of claim 8, wherein for each multidimensional representation, the at least one category and at least one sub-category correspond, respectively, to a type of work and a work activity.

13. The system of claim 8, wherein the processor is configured to initiate operations further including:
determining a schedule of work performances based on the priorities; and
outputting the schedule of work performances.

14. A computer program product, the computer program product comprising:
one or more computer-readable storage media and program instructions collectively stored on the one or more computer-readable storage media, the program instructions executable by a processor to cause the processor to initiate operations including:
receiving a work request with respect to a physical asset;
generating a data structure that encodes the work request as a multidimensional representation indicating at least one classification, wherein each at least one classification includes at least one sub-category; and
responsive to identifying a plurality of work requests encoded as multidimensional representations with respect to the physical asset:
reducing each multidimensional representation to a one-dimensional (1-D) representation that preserves a variance factor of each sub-category of each multidimensional representation;

inputting each 1-D structure to a machine learning model trained to prioritize each of the plurality of work requests;

prioritizing, in accordance with the machine learning model, each of the plurality of work requests based on the 1-D structures; and outputting the priorities of each of the work requests.

15. The computer program product of claim 14, wherein the program instructions are executable by the processor to cause the processor to initiate operations further including:

generating an updated training set by adding the data structure to an existing training set; and training the machine learning model using the updated training set.

16. The computer program product of claim 14, wherein each variance factor of a sub-category indicates at least one of a criticality or urgency of the sub-category.

17. The computer program product of claim 14, wherein the program instructions are executable by the processor to cause the processor to initiate operations further including:

comparing the variance factor of each sub-category following the reducing each multidimensional representation to a 1-D representation with a pre-processing variance factor of each multidimensional representation; and based on the comparing, determining an efficacy of the prioritization engine.

18. The computer program product of claim 14, wherein for each multidimensional representation, the at least one category and at least one sub-category correspond, respectively, to a type of work and a work activity.

19. The computer program product of claim 14, wherein the program instructions are executable by the processor to cause the processor to initiate operations further including:

determining a schedule of work performances based on the priorities; and outputting the schedule of work performances.

20. The computer program product of claim 19, wherein the schedule of work performances comprises a variance-preserving sequence of work activities.

\* \* \* \* \*